US006053476A

United States Patent [19]

Chapman

[11] Patent Number: 6,053,476

[45] Date of Patent: Apr. 25, 2000

[54] CAMERA DOLLY ARM

[75] Inventor: Leonard T. Chapman, North Hollywood, Calif.

[73] Assignee: Chapman/Leonard Studio Equipment, North Hollywood, Calif.

[21] Appl. No.: 09/055,069

[22] Filed: Apr. 3, 1998

[51] Int. Cl.[7] .......... B60P 1/48

[52] U.S. Cl. .......... 254/8 R; 254/2 R; 254/124

[58] Field of Search .......... 254/8 R, 8 B, 254/93 R; 74/89.21, 527

[56] References Cited

U.S. PATENT DOCUMENTS

| | | | |
|---|---|---|---|
| 2,616,768 | 11/1952 | Stemn | 254/8 R |
| 3,168,284 | 2/1965 | Fisher | 254/8 R |
| 3,915,429 | 10/1975 | Zelli | 254/8 R |
| 4,360,187 | 11/1982 | Chapman | 254/8 R |
| 4,950,126 | 8/1990 | Fabiano et al. | 254/8 R |
| 5,037,068 | 8/1991 | Grotessi | 254/8 R |

OTHER PUBLICATIONS

Technical Manual—"The Super Peewee", Chapman/Leonard Studio Equipment, 1992, 5 pages.

2 Photographs of Falcon Dolly, 1996.

*Primary Examiner*—David A. Scherbel
*Assistant Examiner*—Lee Wilson
*Attorney, Agent, or Firm*—Lyon & Lyon LLP

[57] ABSTRACT

A camera dolly has an upper arm pivotable on a lower arm. Chains and sprockets within the lower arm raise the upper arm when the lower arm is raised by a hydraulic actuator. Leveling rods maintain a camera platform in a level position as the arm is raised and lowered. A center plate in the lower arm and a brace plate in the upper arm increase the strength and stiffness of the arm. The ratio between the lower sprocket and upper sprocket within the lower arm is greater than 2:1, providing additional arm travel. A structural tube in the upper arm section provides a secure attachment point for a leveling head.

20 Claims, 9 Drawing Sheets

CAMERA DOLLY ARM

BACKGROUND OF THE INVENTION

The field of the present invention is camera dollies.

In the production of television programs or motion pictures, it is often necessary to maneuver a camera between different filming positions. The required camera movement may include raising and lowering the camera as well as lateral and longitudinal movement between the camera and the subject. Continuous translation of the camera, i.e., to follow an action or moving sequence is also often called for. Camera dollies are used to support the camera and perform the desired camera movement. The camera operator and other professionals, such as a director of photography, may sit or stand on the camera dolly during filming.

It is important for the camera dolly to provide a stable platform for the camera, both at rest and when moving. Any shock, vibrations, jarring or rocking imparted by the dolly will cause the recorded film or video image sequence to jump unacceptably. Consequently, the dolly structure must be strong and rigid.

Various camera dollies have successfully used in the past. One well known camera dolly, the Chapman/Leonard PeeWee Camera Dolly, has a folding arm including a upper section pivotably attached to a lower section. The lower arm section is raised by a hydraulic actuator, which in turn also raises the upper arm section, using gears, or chains and sprockets, within the lower arm section, as described in U.S. Pat. No. 4,360,187, incorporated herein by reference.

While the arm design of the PeeWee Camera Dolly, as described in U.S. Pat. No. 4,360,187, has performed well, the inventor has now come to realize that further improvements can be made to make the arm even stronger and more steady, and to increase the range of movement of the arm. It is therefore an object of the invention to provide an improved arm for a camera dolly.

Other and further objects and advantages will appear hereinafter.

SUMMARY OF THE INVENTION

To these ends, a camera dolly has an upper arm pivotable on a lower arm. Upper and lower sprockets are connected by a chain inside of the lower arm, for pivoting the upper arm upwardly, when the lower arm is raised by an actuator. The lower arm advantageously has a lower arm housing and a cover plate. A center plate is positioned in between and attached to the lower arm housing and to the cover plate, thereby strengthening the arm.

The upper arm section preferably has an upper arm housing and an upper arm cover plate. A brace plate is advantageously attached to the upper arm housing. Most desirably, the upper arm housing includes a lower tube and an upper tube, to strengthen the upper arm section and reduce deflection under load. The ratio between the diameter of the lower and upper sprockets in the lower arm section is preferably greater than 2:1.

BRIEF DESCRIPTION OF THE DRAWINGS

Other objects and features of the present invention will become apparent from the following detailed description taken in connection with the accompanying drawings, which disclose the preferred embodiment of the invention. It is to be understood, however, that the drawings are designed for the purpose of illustration only and are not intended as a definition of the limits of the invention.

In the drawings, wherein similar reference numbers denote similar elements throughout the several view.

DETAILED DESCRIPTION OF THE DRAWINGS

Figure 1:
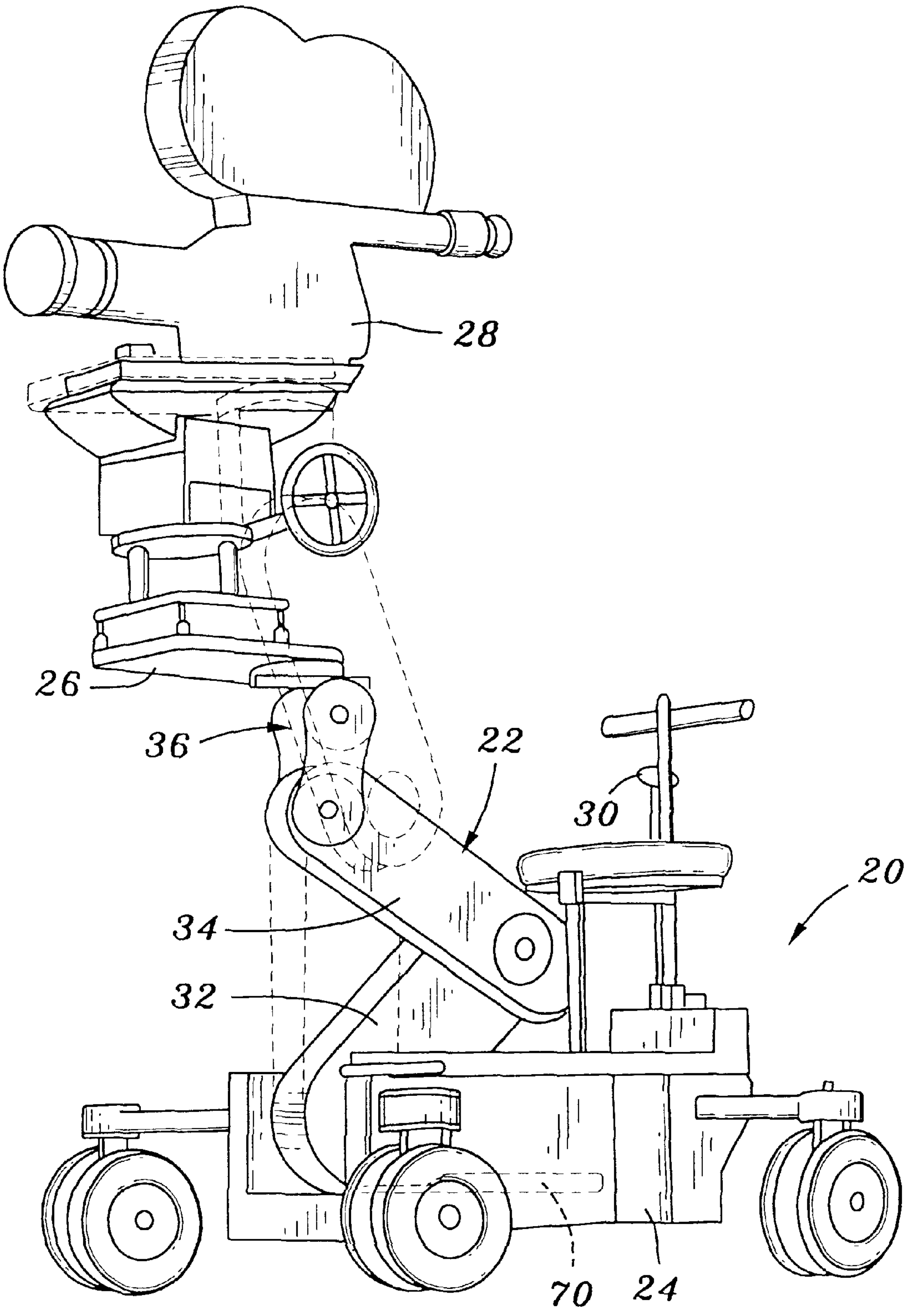
FIG. 1 is a perspective view of the present camera dolly supporting a motion picture camera.

Turning now in detail to the drawings, as shown in FIG. 1, a camera dolly 20 has an arm 22 supported on a chassis 24. A camera 28 is mounted on a camera platform 26 on top of the arm 22. The lower arm section 32 of the arm 22 contains chains and sprockets which drive the upper arm section 34, as the lower arm section 32 is pivoted upwardly by a hydraulic actuator 70. A boom or arm control 30 is positioned at the back of the chassis 24 to control movement of the arm 22. In the embodiment shown, a leveling head 36 is attached to the upper arm section 34 and supports the camera platform 26. The leveling head 36, as described in U.S. patent application Ser. No. 08/411,501 (incorporated herein by reference) provides several advantages and is preferred. However, the arm 22 may be provided and used with or without the leveling head 36. When no leveling head 36 is used, the camera platform 26 is simply attached to a nose piece joined to the upper end of the upper arm section 34, as described in U.S. Pat. No. 4,360,187.

Figure 2:
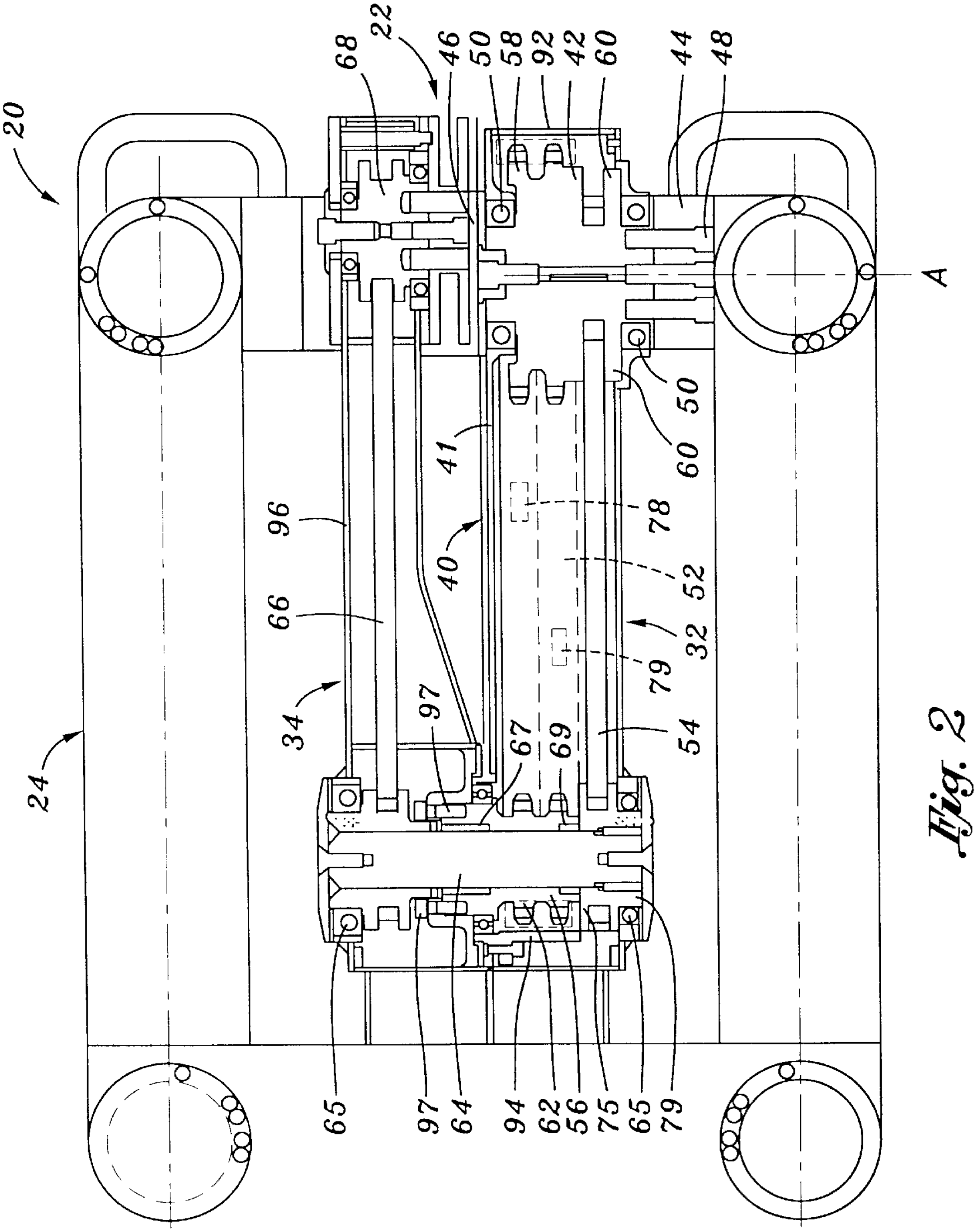
FIG. 2 is a partial plan view thereof, in part section, showing the arm in the down or folded position.
Figure 7:
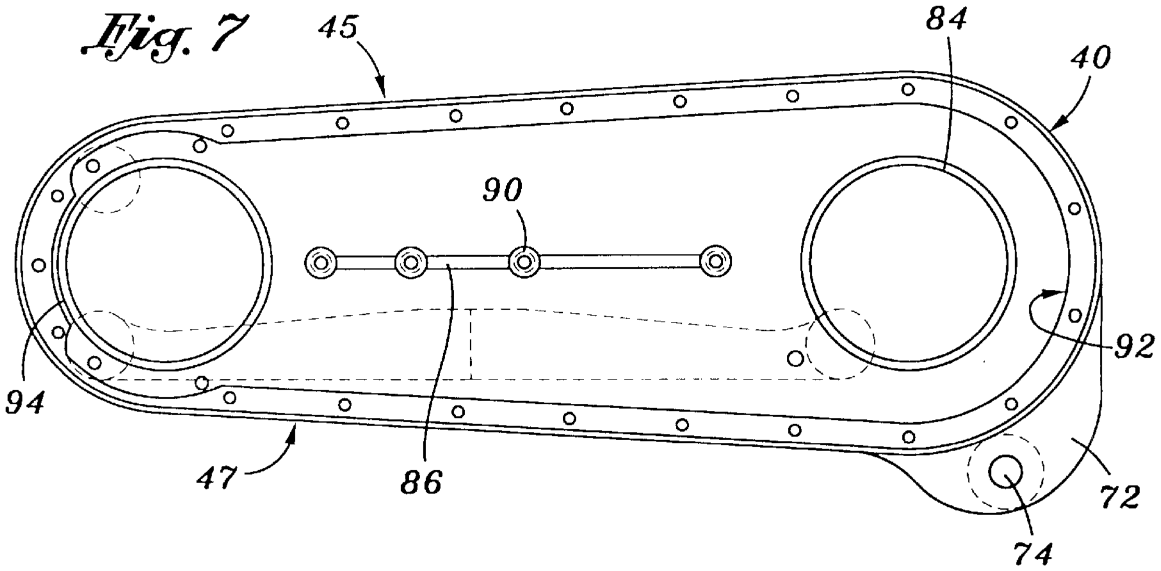
FIG. 7 is side view of the lower arm section housing.

Referring now to FIGS. 2 and 7, the lower arm section 32 includes a lower arm housing 40. A lower gear 42 within the lower arm housing 40 is irrotatably secured to the chassis 24 via left and right hub plates 46 and 44, and bolts 48. The lower arm housing 40 is supported on bearings 50 on either side of the fixed lower gear 42, so that the lower arm section 32 can pivot about axis A relative to the chassis 24.

Figure 10:
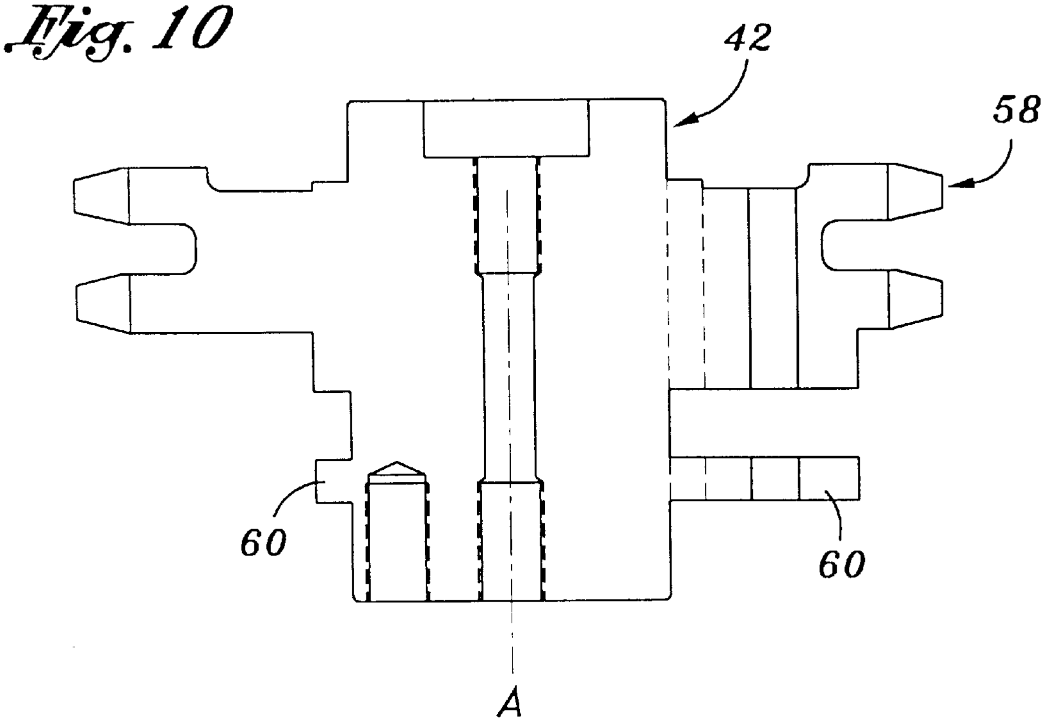
FIG. 10 is a plan view of the lower gear shown in FIG. 2.
Figure 11:
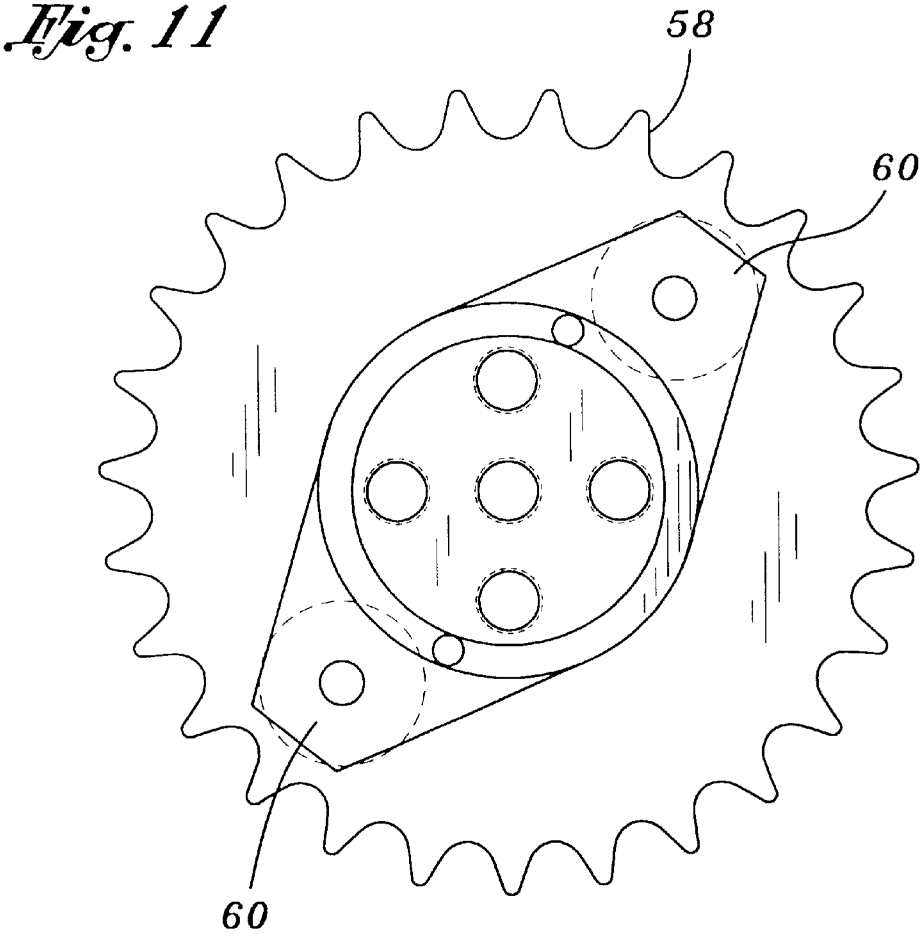
FIG. 11 is a side elevation view thereof.

Referring momentarily to FIGS. 10 and 11, the lower gear 42 includes a double lower sprocket 58, preferably having 27 pairs of teeth. Arms 60 extend radially outwardly from the center of the lower gear 42.

Figure 12:
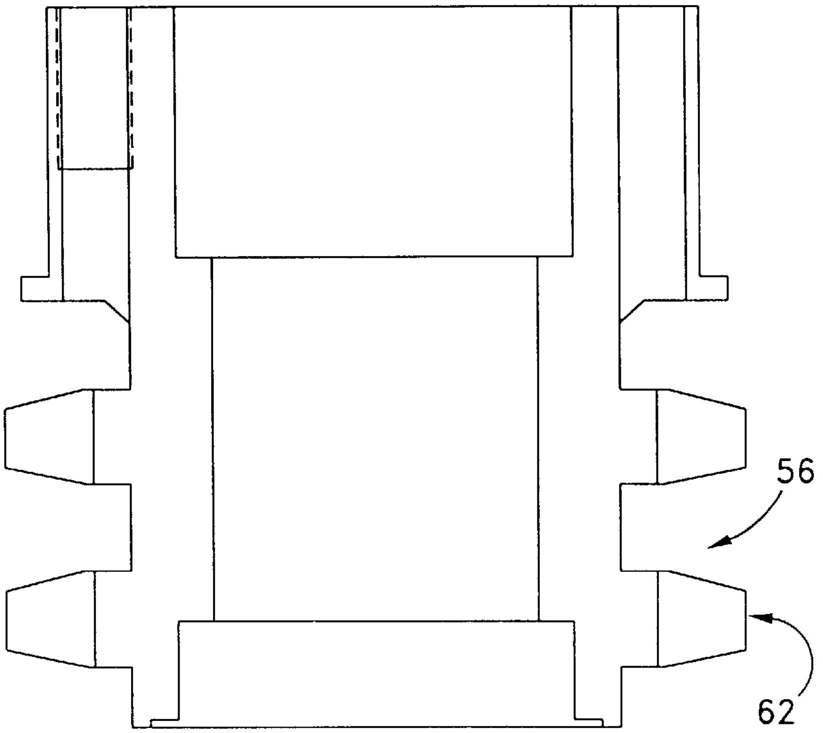
FIG. 12 is a plan view of the upper gear shown in FIG. 2.
Figure 13:
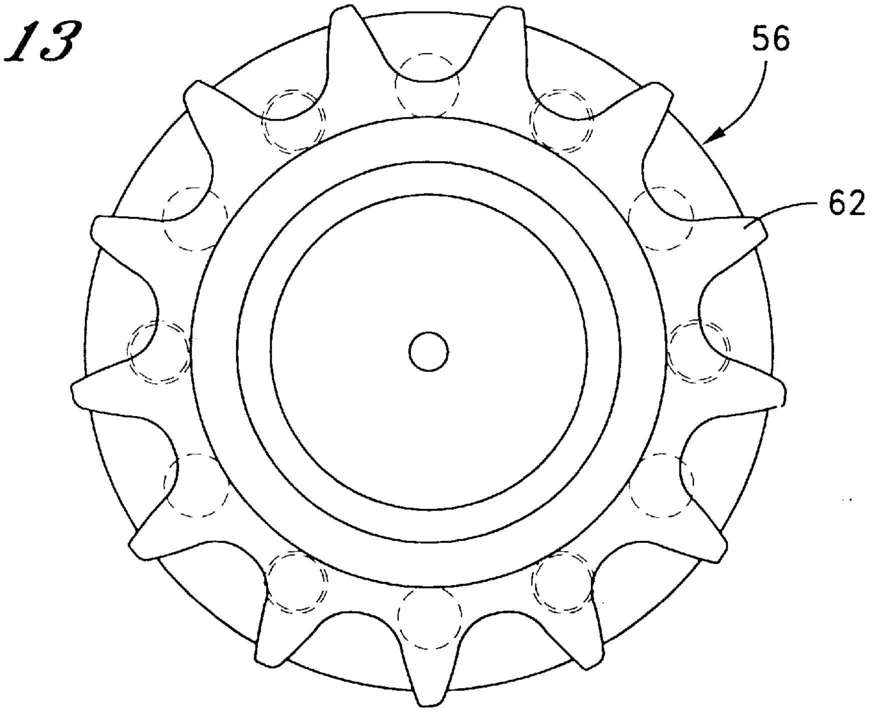
FIG. 13 is a side elevation view thereof.

Referring to FIGS. 2, 12 and 13, an upper gear 56 within the lower arm housing 40 includes a double upper sprocket 62, preferably having 13 pairs of teeth. Referring now to FIG. 2, a double chain 52 extends around the double lower sprocket 58 of the lower gear 42 and around the double upper sprocket 62 of the upper gear 56, in an endless loop, interrupted only by tightening adjusting links 78 and 79, shown in FIG. 3.

An upper arm housing 96 is pivotably joined to the lower arm housing 40 via a cross shaft 64. The lower end of the upper arm housing 96 is attached to (and rotates with) the upper gear 56, via bolts 97. The cross shaft 64 is pivotably mounted within both the lower arm housing 40 and the upper arm housing 96 via bearings 65. Needle bearings 67 and 69 add further stabilization.

Figure 3:
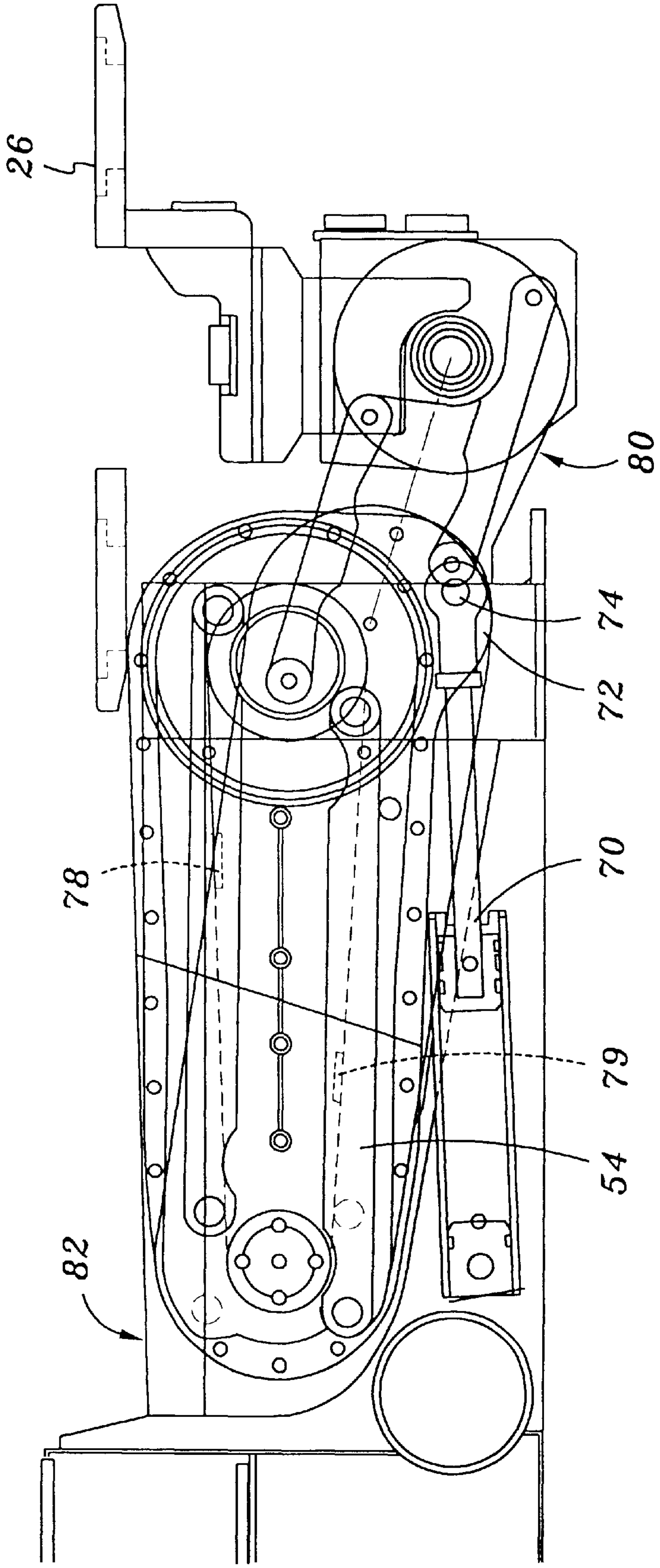
FIG. 3 is a side view thereof.
Figure 4:
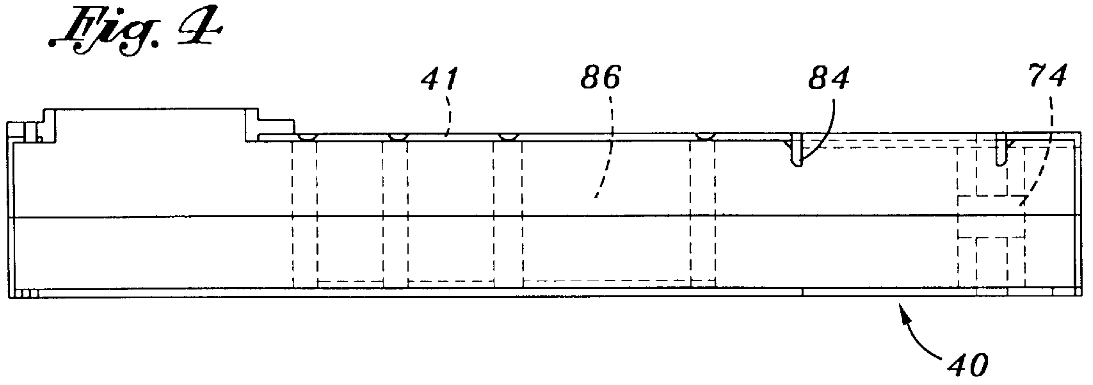
FIG. 4 is a plan view of the lower arm housing of the arm shown in FIGS. 1–3.
Figure 5:
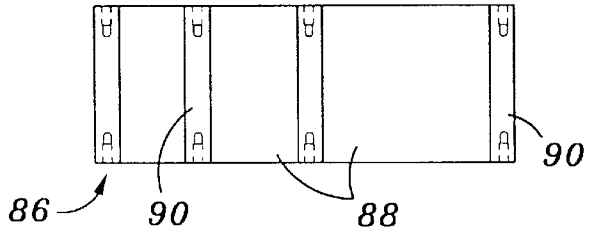
FIG. 5 is plan view of the center plate of the lower arm section.
Figure 6:
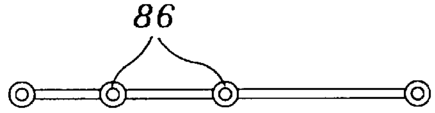
FIG. 6 is a side view thereof.

Referring to FIGS. 2 and 3, a pair of lower leveling rods 54 are pinned or pivotally attached to the arms 60 of the lower gear 42, at the lower end of the lower arm section 32. The upper ends of the lower leveling rods 54 are attached to arms 75, on a hub 79 joined to the cross shaft 64.

Similarly, and as described in U.S. Pat. No. 4,360,187, a pair of upper leveling rods 66 extend within the upper arm housing 96 from the cross shaft 64 to an upper disk 68.

Referring to FIG. 3, a hydraulic actuator 70 is attached between the chassis 24 and to an attachment pin 74 on a flange 72 on the lower arm housing 40. The arm 22 is designed so that, when in the down position, as shown in FIG. 3, the top surface of the lower arm housing 40 is flush, or below the chassis top deck 82, to provide an aesthetic appearance and an increased range of travel at the low end.

Referring to FIGS. 4–7, a center plate 86 having posts 90 spaced apart by web sections 88 is centrally positioned within the lower arm housing 40. The center plate 86 is bolted to the left side wall 41 of the lower arm housing 40. The right side wall of the lower arm housing 40 is formed as a removable cover plate (not shown), which is also bolted to the right side of the center plate 86. The center plate 86 increases the strength and stiffness of the lower arm section 32, which is thereby better able to resist bending and twisting forces and moments generated on the arm 22 by heavy payloads or rapid arm or dolly movements. As the double chain 52 and lower leveling rods 54 are positioned near the top and bottom surfaces 45 and 47 of the lower arm housing 40, the center plate 86 does not interfere with operation of the arm 22.

A bearing flange 84 extends inwardly into the lower arm housing 40 from the left side wall 41, to position and support the left bearing 50.

Figure 14:
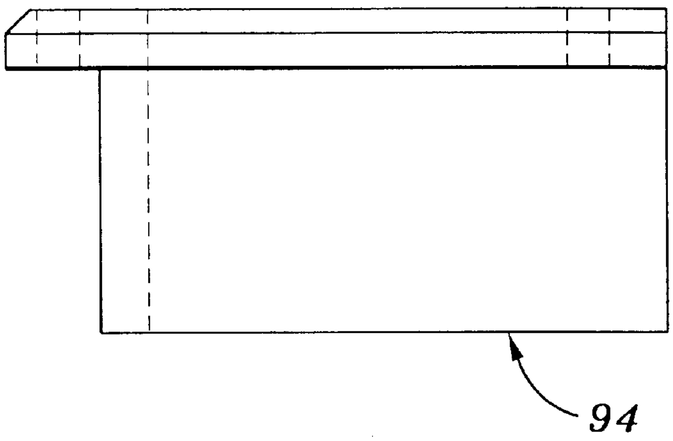
FIG. 14 is a side view of the chain guard shown in FIG. 2.
Figure 15:
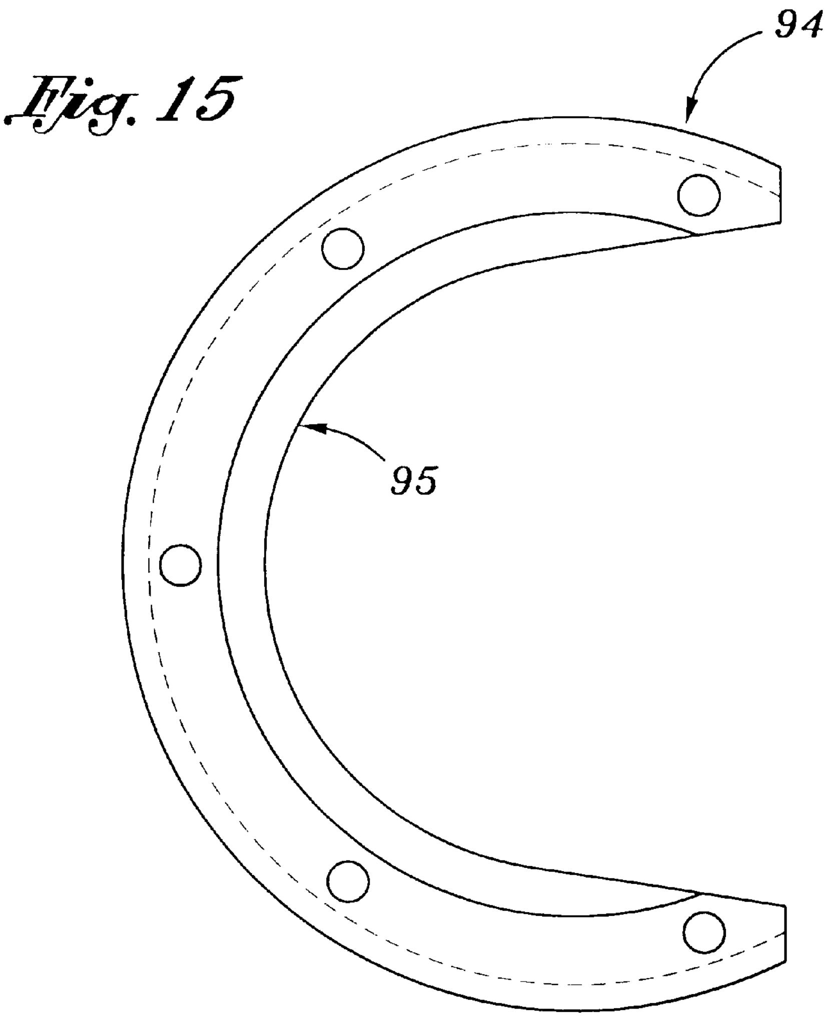
FIG. 15 is a plan view thereof.

Referring to FIGS. 2, 14 and 15, a chain guard 94 is positioned around the outer end of the double upper sprocket 62 and secured to the lower arm housing 40. The inner surface of the 95 of the chain guard 94 (shown in FIG. 15) is spaced just slightly away from the double chain 56 as it wraps around the double upper sprocket 62. Similarly, at the lower end of the lower arm section 32, the curved wall 92 of the lower arm housing 40 is spaced just slightly away from the double chain 52 as it wraps around the double lower sprocket 58 on the lower gear 42. The chain guard 94 and the curved wall 92 prevent the double chain 52 from riding up on the sprocket teeth of the double sprockets 58 and 62, when the arm 22 is placed under heavy loading. Accordingly, the double chain 52 is not able to skip teeth on the sprockets, even under heavy loads.

Figure 8:
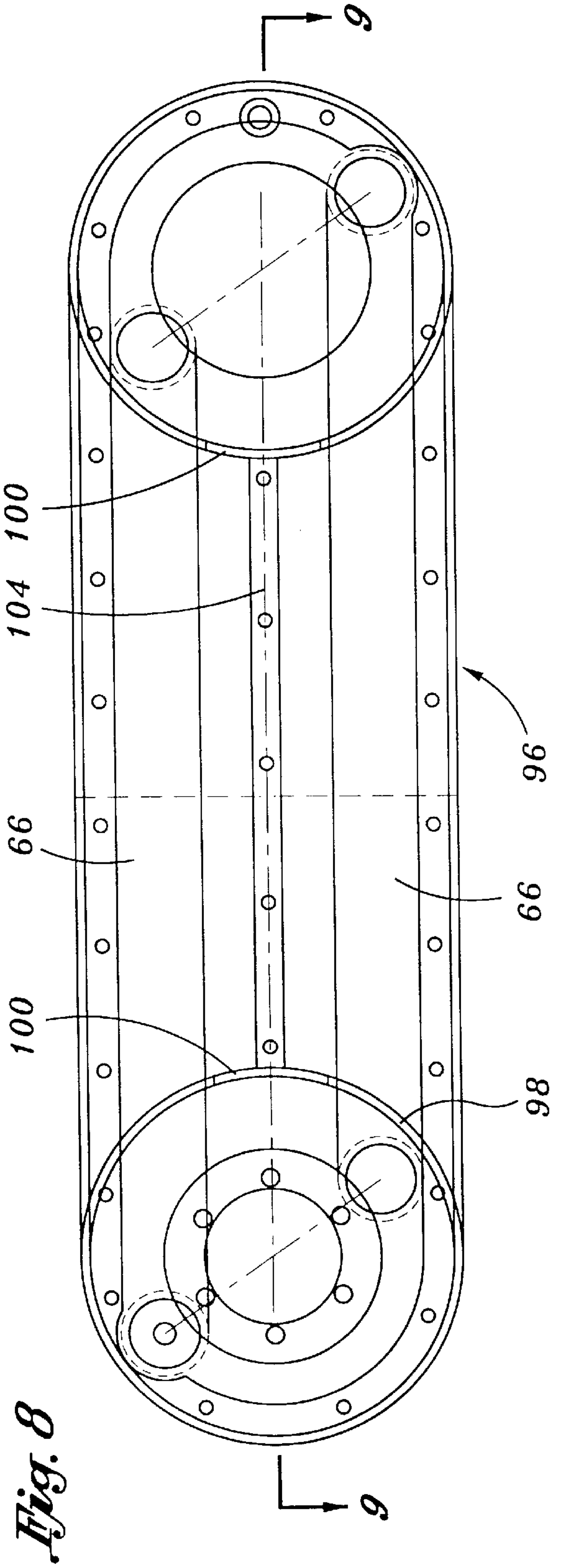
FIG. 8 is a side elevation view of the upper arm section housing, and the disks and leveling rods contained within the upper arm housing.
Figure 9:
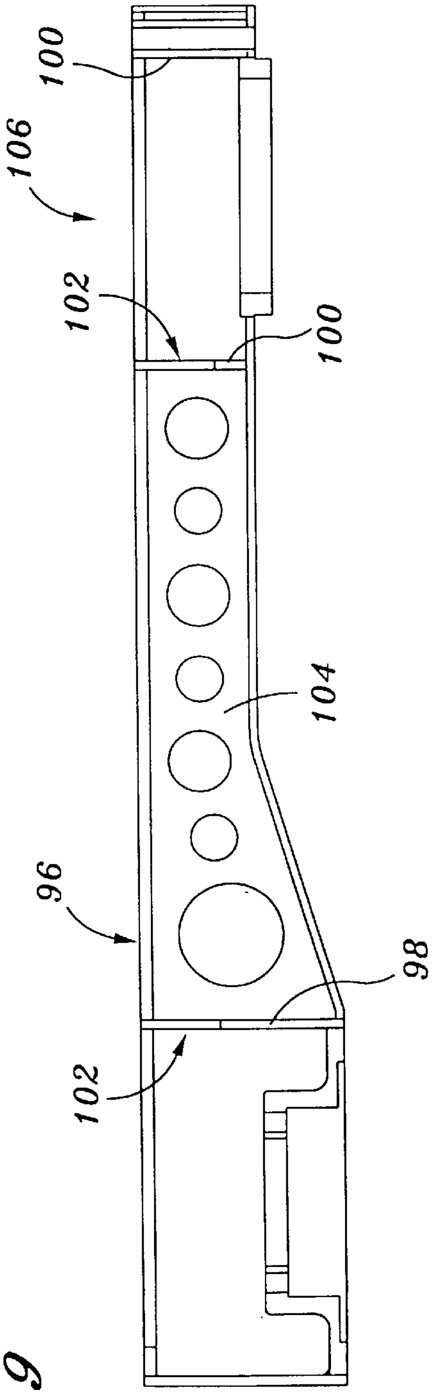
FIG. 9 is a section view taken along line 9—9 of FIG. 8.

Referring to FIGS. 8 and 9, the upper arm housing 96 includes a lower tube 98 and an upper tube 100 joined via a brace plate 104. Windows 102 are provided in the lower tube 98 and upper tube 100, to provide clearance for the upper leveling rods 66, which extend between the lower and upper disks in the upper arm section 34. The brace plate 104 is preferably welded to the upper and lower tubes 100 and 98 and the other structure of the upper arm housing 96. The brace plate 104 stiffens the upper arm section 34 against bending and twisting, similar to the center plate 86 in the lower arm section 32.

Figure 16:
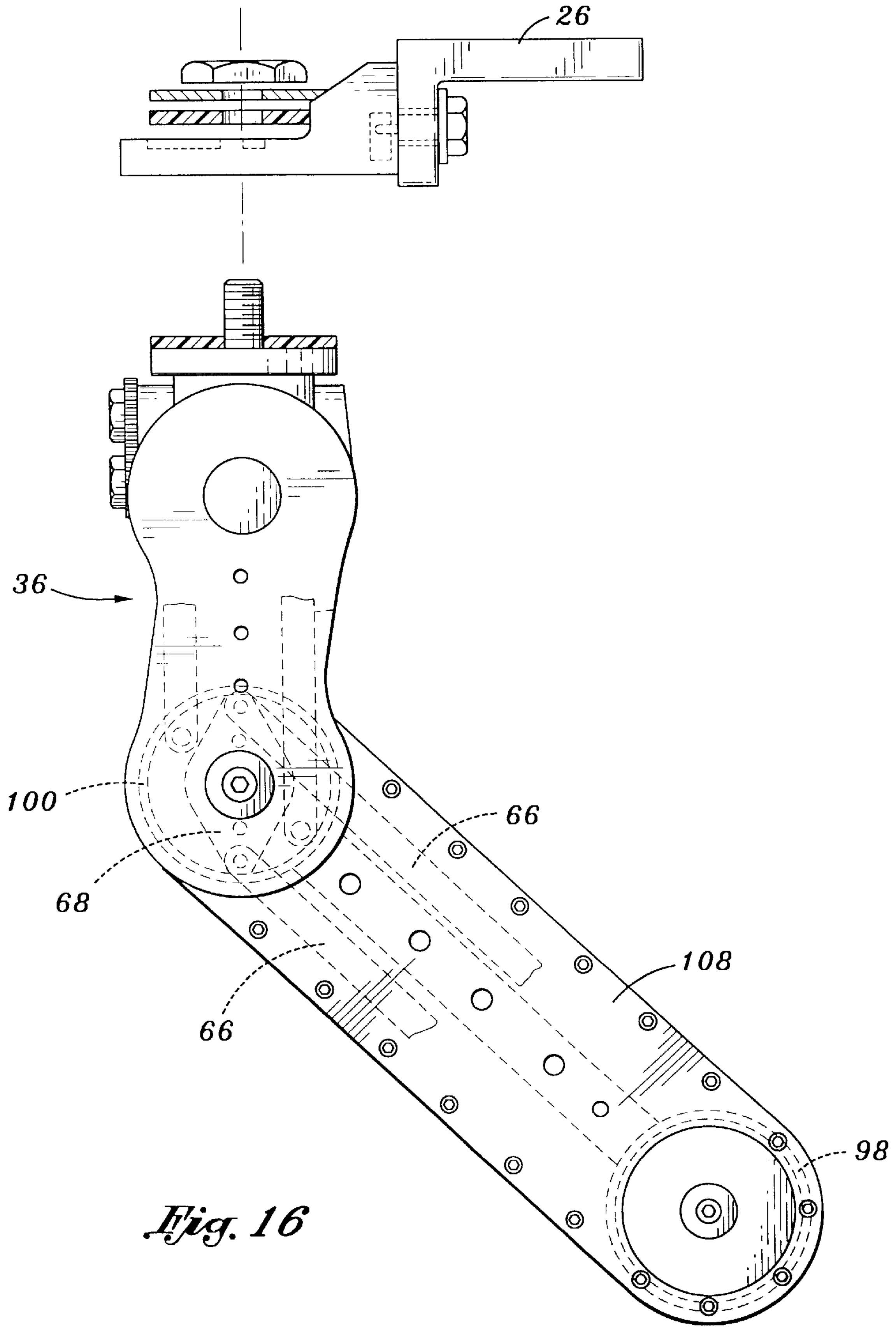
FIG. 16 is a side view of a leveling head on the upper arm section in a partially raised position.

The upper tube 100 provides a secure structural hard point for attachment of the leveling head 36, as shown in FIG. 16. A cover plate 108 is bolted on to the upper arm housing 96, around the edges, and also to the brace plate 104.

In use, the arm 22 operates in a manner similar to the arm described in U.S. Pat. No. 4,360,187, and in a manner similar to the well known PeeWee Camera Dolly. However, the arm 22 is improved in several aspects. The arm is stiffer and more resistant to bending and twisting, due to the center plate 86 in the lower arm section 32, and the brace plate 104 in the upper arm section 34. The chain guard 94 and the minimum spacing of the curved wall 92 of the lower arm housing 40 prevent the double chain 52 from skipping sprocket teeth. The preferred 27:13 ratio between the lower sprocket 58 and upper sprocket 62 provides additional vertical travel to the arm 22. There is also less arc in the travel of the camera platform 26. The upper tube 100 provides a more secure attachment point for the leveling head 38. The lower arm section 32 is more compact and has a more uniform taper resulting from the use of the sprockets.

The hydraulic actuator 70 is positioned substantially horizontally, thereby reducing air entrapment disadvantages in the hydraulic system.

Thus, while a single embodiment has been shown and described, it will be apparent to those skilled in the arm that various modifications, substitutions, and uses of equivalents may readily be made without departing from the spirit and scope of the invention. The invention, therefore, should not be restricted, except by the following claims and their equivalents.

What is claimed is:

1. In a camera dolly of the type having an upper arm pivotable on a lower arm, and upper and lower sprockets connected by a chain inside of the lower arm, for pivoting the upper arm in a direction opposite to movement of the lower, when the lower arm is acted on by a hydraulic actuator, and including leveling rods within the upper and lower arms for maintaining a camera platform in a level position as the upper arm is raised and lowered, the improvement comprising:

the lower arm having a lower arm housing and a cover plate, and a center plate positioned inbetween and attached to the lower arm housing and to the cover plate and with the center plate perpendicular to the cover plate.

2. The camera dolly of claim 1, wherein the upper arm comprises an upper arm housing and an upper arm cover plate, and a centered brace plate attached to the upper arm housing.

3. The camera dolly of claim 1 wherein the upper arm includes an upper arm housing having a lower tube and an upper tube at opposite ends of the upper arm housing, with the upper and lower tubes each connected to the brace plate, and with leveling arm windows extending through the lower tube and the upper tube.

4. The camera dolly of claim 1 wherein the cover plate on the lower arm is split into two pieces.

5. The camera dolly of claim 1 wherein the hydraulic actuator is positioned substantially horizontally.

6. The camera dolly of claim 1 wherein the ratio between the size of the lower sprocket to the size of the upper sprocket is greater than 2:1.

7. The camera dolly of claim 1 wherein the lower sprocket has 27 teeth and the upper sprocket has 13 teeth or in an equivalent proportional ratio.

8. The camera dolly of claim 1 further comprising a leveling head attached to the upper arm.

9. The camera dolly of claim 1 wherein the upper arm and the lower arm are both positioned below the deck level of the chassis of the dolly, when the arm is in the full down position.

10. The camera dolly of claim 1 wherein the lower end of the lower arm housing is adjacent to the lower sprocket and acts as a chain guard to prevent the chain from riding up and skipping over the sprocket teeth when under high load conditions.

11. The camera dolly of claim 1 further comprising a chain guard at the upper end of the lower arm housing and positioned around the upper sprocket.

12. The camera dolly of claim 1 further comprising a flange on the lower arm housing, and with the actuator attached to the flange.

13. The camera dolly of claim 1 wherein the lower tube and the upper tube and the brace plate in the upper arm are welded into and integral with the upper arm housing.

14. A camera dolly having an upper arm pivotable on a lower arm, and upper and lower sprockets connected by a chain inside of the lower arm, for pivoting the upper arm in a direction opposite to movement of the lower, when the lower arm is acted on by a hydraulic actuator, and including leveling rods within the upper and lower arms for maintaining a camera platform in a level position as the upper arm is raised and lowered, comprising:

the lower arm having a lower arm housing and a cover plate, and a center plate positioned inbetween and attached to the lower arm housing and to the cover plate; and the upper arm having an upper arm housing having a lower tube and an upper tube at opposite ends thereof;

and a centered brace plate attached to the upper and lower tubes;

and with the leveling arm windows extending through the lower tube and the upper tube, to provide clearance for the leveling rods.

15. A camera dolly comprising:

a chassis;

an arm on the chassis, the arm having a lower arm section including a lower arm housing, and an upper arm section having an upper arm housing pivotably attached to the lower arm section;

a lower gear within the lower arm housing irrotatably attached to the chassis, the lower gearing having a double lower sprocket;

an upper gear with the lower arm housing, the upper gear having a double upper sprocket;

a pair of chains in the lower arm housing linking the double lower sprocket to the double upper sprocket;

a pair of lower leveling rods within the lower arm housing, the lower leveling rods having lower ends pivotably attached to the lower gear, and having upper ends pivotably attached to a hub, an upper arm housing attached to the hub and pivotably attached to the lower arm housing;

a cross shaft joined to the hub and extending into the lower arm housing;

a pair of upper leveling rods pivotably attached to the cross shaft and to an upper disk in the upper arm housing;

the upper arm housing having a length greater than the length of the lower arm housing, and the distance between the centers of the cross shaft and the upper disk greater than the distance between the centers of the lower and upper gears in the lower housing; and the ratio of the diameters of the lower gear to the upper great exceeding 2:1 to minimize arcing travel of the upper end of the upper arm, as the arm is raised and lowered.

16. The camera dolly of claim 15 wherein the lower arm housing is positionable entirely vertically below the upper arm housing, when the arm is in a folded or lowered position.

17. The camera dolly of claim 15 wherein, with the arm in a folded or down position, center of the upper gear is vertically above a center of the lower gear.

18. The camera dolly of claim 16 wherein, the arm is below the level of the chassis, when the arm is in a down position.

19. The camera dolly of claim 15 further comprising a center plate attached to the lower arm housing, between the leveling rods, and a cover plate attached to the center plate and to the lower arm housing.

20. A camera dolly, comprising;

a lower arm pivotably attached to a frame;

an upper arm pivotably attached to the lower arm, the upper arm having:

an upper arm housing having a lower tube and an upper tube, and a brace plate joined to the lower and upper tubes, and with the upper and lower tubes having windows therethrough, and a cover plate attached to the upper arm housing.

* * * * *